(12) United States Patent
Hayashi et al.

(10) Patent No.: US 9,795,012 B2
(45) Date of Patent: Oct. 17, 2017

(54) LIGHTING SYSTEM, CONTROLLER, OPERATION TERMINAL, AND ADDRESS DETERMINING METHOD

(71) Applicant: PANASONIC INTELLECTUAL PROPERTY MANAGEMENT CO., LTD., Osaka (JP)

(72) Inventors: Ryuhei Hayashi, Osaka (JP); Yuichi Ejiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/336,058

(22) Filed: Oct. 27, 2016

(65) Prior Publication Data

US 2017/0127498 A1    May 4, 2017

(30) Foreign Application Priority Data

Oct. 30, 2015    (JP) ................................. 2015-213979

(51) Int. Cl.
*G05B 15/00*    (2006.01)
*H05B 37/02*    (2006.01)

(52) U.S. Cl.
CPC ......... *H05B 37/0254* (2013.01); *G05B 15/00* (2013.01); *G05B 2219/31* (2013.01); *G05B 2219/31308* (2013.01)

(58) Field of Classification Search
CPC ................ G05B 15/00; G05B 2219/31; G05B 2219/31308
USPC ........................ 315/308; 345/156; 700/83, 86
See application file for complete search history.

(56) References Cited

U.S. PATENT DOCUMENTS

| 8,634,848 | B1 * | 1/2014 | Bozarth | H04W 64/00 |
| | | | | 455/41.2 |
| 9,170,318 | B1 * | 10/2015 | Bozarth | H04W 64/00 |
| 2017/0104532 | A1 * | 4/2017 | Stout | H04B 10/116 |

FOREIGN PATENT DOCUMENTS

JP    2014-044915 A    3/2014

* cited by examiner

*Primary Examiner* — Thuy Vinh Tran
(74) *Attorney, Agent, or Firm* — McDermott Will & Emery LLP

(57) ABSTRACT

When a controller receives an external instruction for initial setting, the controller gives image sensors an instruction regarding lighting. When an image sensor among the image sensors receives the instruction regarding lighting from the controller, the image sensor performs lighting control in accordance with the instruction regarding lighting on a luminaire among luminaires to determine (i) a relative position of the luminaire relative to the image sensor and (ii) a relative position of the image sensor relative to a different image sensor among the image sensors. The controller determines positions of the image sensors and positions of the luminaires by collecting the relative positions of the image sensors and the relative positions of the luminaires determined by the image sensors.

5 Claims, 6 Drawing Sheets

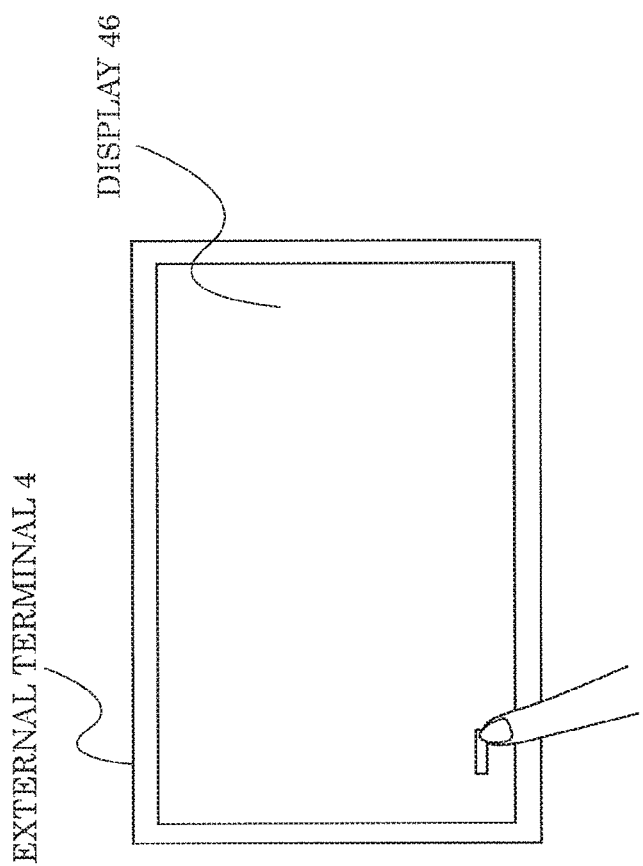

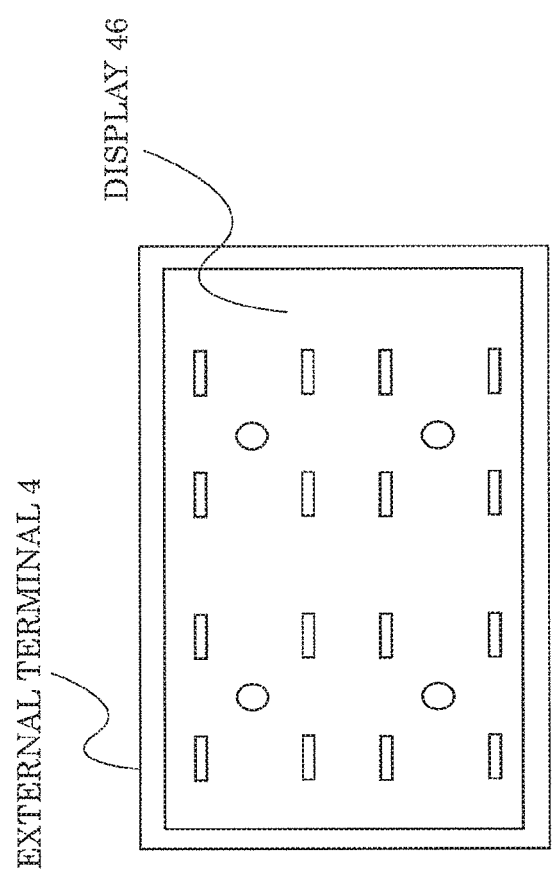

LIGHTING SYSTEM, CONTROLLER, OPERATION TERMINAL, AND ADDRESS DETERMINING METHOD

CROSS REFERENCE TO RELATED APPLICATION

This application claims the benefit of priority of Japanese Patent Application Number 2015-213979 filed on Oct. 30, 2015, the entire content of which is hereby incorporated by reference.

BACKGROUND

1. Technical Field

The present disclosure relates to a lighting system, a controller, an operation terminal, and an address determining method.

2. Description of the Related Art

Japanese Unexamined Patent Application No. 2014-44915 (Patent Literature 1) describes a lighting system which controls lighting states of luminaires using a controller.

SUMMARY

The present disclosure aims to provide: a lighting system which (i) includes luminaires, image sensors which perform lighting control on the luminaires, and a controller which gives the image sensors an instruction regarding lighting of the luminaires and (ii) is capable of easily determining a positional relationship among the luminaires and the image sensors; the controller; an operation terminal; and an address determining method for the lighting system.

In order to solve the above problem, an address determining method according to the present disclosure is an address determining method for determining, in a lighting system including luminaires, image sensors which perform lighting control on the luminaires, and a controller which gives image sensors an instruction regarding lighting of the luminaires, a positional relationship among the luminaires and the image sensors, wherein when the controller receives an external instruction for initial setting, the controller gives the image sensors the instruction regarding lighting, when an image sensor among the image sensors receives the instruction regarding lighting from the controller, the image sensor performs lighting control in accordance with the instruction regarding lighting on a luminaire among the luminaires to determine (i) a relative position of the luminaire relative to the image sensor and (ii) a relative position of the image sensor relative to a different image sensor among the image sensors, and the controller determines positions of the image sensors and positions of the luminaires by collecting the relative positions of the image sensors and the relative positions of the luminaires determined by the image sensors.

In order to solve the above problem, a lighting system according to the present disclosure determines a positional relationship among the luminaires and the image sensors using the above described address determining method.

In order to solve the above problem, a controller according to the present disclosure determines a positional relationship among the luminaires and the image sensors using the above described address determining method.

In order to solve the above problem, an operation terminal according to the present disclosure is an operation terminal which gives an instruction for initial setting to a controller which performs lighting control of luminaires, the operation terminal including: a storage which stores a layout of icons indicating the luminaires; a display unit configured to display the layout; an operation unit configured to receives an operation for the display unit from an installation setting person; and a determining unit, wherein after causing, via the controller, one luminaire among the luminaires to light up and associating the one luminaire caused to light up with, among the icons displayed by the display unit, an icon selected as a result of the operation unit receiving an operation from the installation setting person, the determining unit is configured to associate a luminaire among the luminaires other than the one luminaire with an unselected icon among the icons.

The lighting system, the controller, the operation terminal, and the address determining method according to the present disclosure make it possible to easily determining, in the lighting system which includes luminaires, image sensors which perform lighting control on the luminaires, and the controller which gives the image sensors an instruction regarding lighting of the luminaires, a positional relationship among the luminaires and the image sensors.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a diagram illustrating an indication of an image sensor selected by a setting person, which is displayed on an external terminal, according to the embodiment.

FIG. 6 is a diagram illustrating an exemplary layout of image sensors and luminaires which is displayed on the external terminal, according to the embodiment.

DETAILED DESCRIPTION OF THE EMBODIMENT

The following describes an embodiment in detail, with reference to the drawings as necessary. However, unnecessarily detailed description may be omitted. For example, a detailed description of the matters already known well and a repeated description of substantially the same configuration may be omitted.

This is intended to avoid making the following description unnecessarily redundant, and to facilitate understanding of a person skilled in the art. It should be noted that the inventors provide the accompanying drawings and the following description in order that a person skilled in the art sufficiently understands the present disclosure, and thus do not intend to limit a subject matter disclosed in the claims to the drawings and description.

Embodiment

Hereinafter, the embodiment is described with reference to FIGS. 1 to 6.

[1-1. Configuration]

Figure 1:
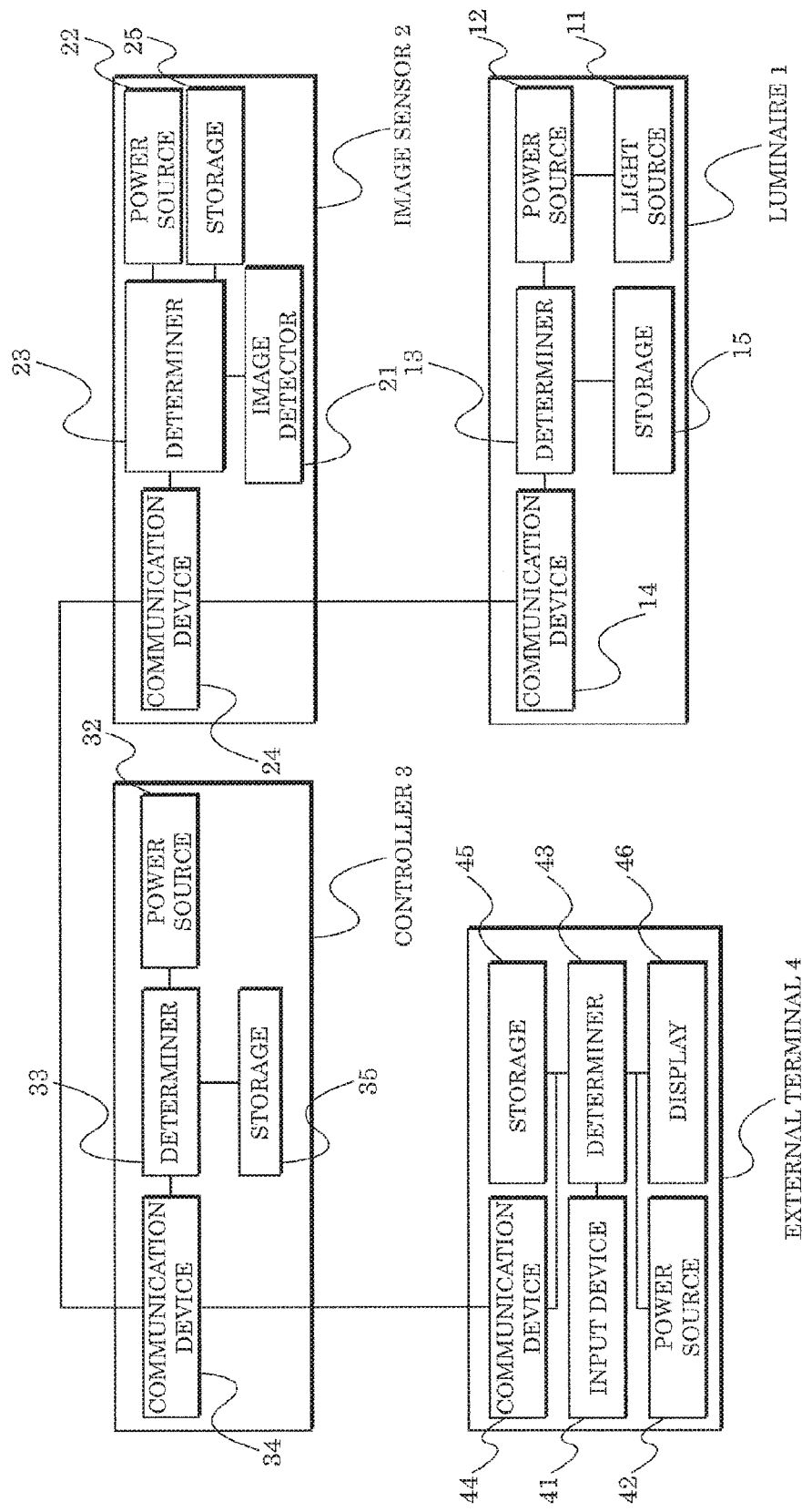
FIG. 1 is a block diagram illustrating a configuration of a lighting system according to an embodiment.

FIG. 1 is a block diagram illustrating a configuration of a lighting system according to the embodiment.

Figure 2:
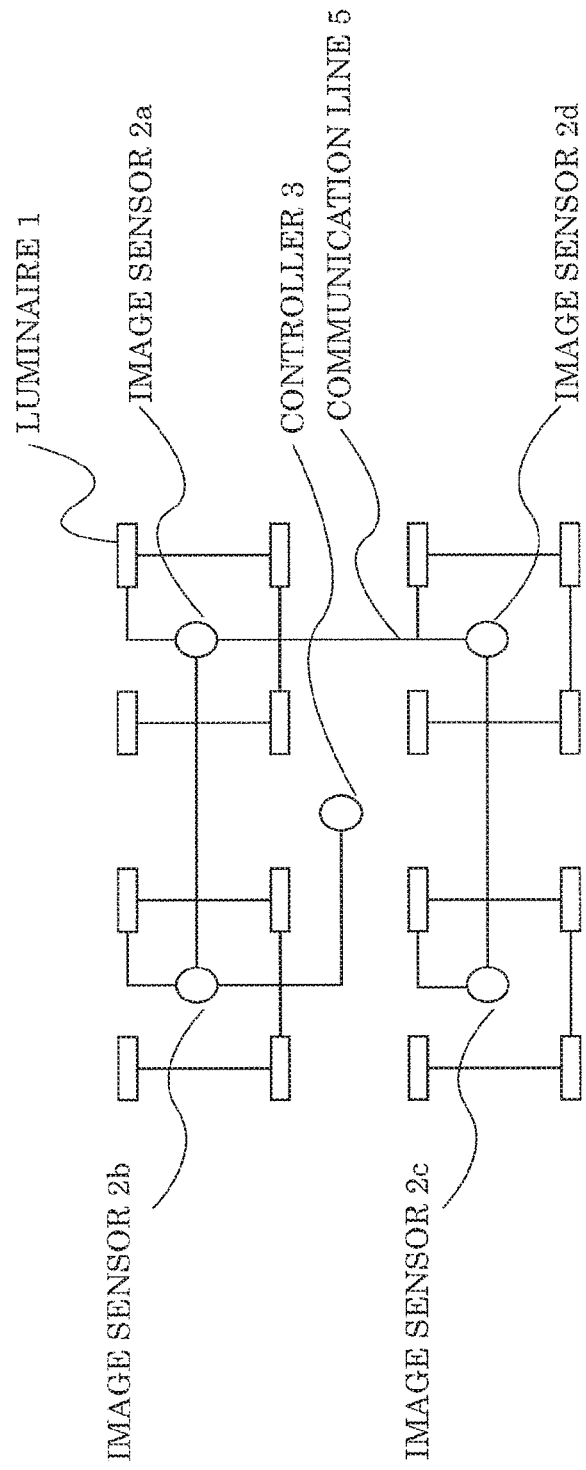
FIG. 2 is a block diagram illustrating an exemplary layout and configuration of a controller, image sensors, and luminaires according to the embodiment.

FIG. 2 is a block diagram illustrating an exemplary layout and configuration of a controller, image sensors, and luminaires according to the embodiment.

The lighting system includes luminaires 1, image sensors 2, controller 3, and external terminal 4. FIG. 1 illustrates one of image sensors 2 and one of luminaires 1. It is to be noted that the lighting system may not include external terminal 4.

As illustrated by FIG. 2, in the lighting system according to the embodiment, image sensors 2a to 2d and controller 3 are connected via communication line 5. It is to be noted that image sensors 2a to 2d are generally referred to as image sensor 2.

Four luminaires 1 are connected to each image sensor 2, for example. In the following description, each luminaire 1 connected to image sensor 2 is referred to as subordinate luminaire 1. Image sensor 2 is placed in the middle of four subordinate luminaires 4. Image sensor 2 is installed in a position where brightness above a surface can be detected such as an illumination-target surface of four luminaires 1. Examples of the illumination-target surface include a floor surface.

Luminaires 1 are assigned mutually different addresses. In addition, image sensors 2 are assigned mutually different addresses. The addresses of luminaires 1 and the addresses of image sensors 2 are random addresses and are preassigned to luminaires 1 and image sensors 2. Moreover, when the lighting system includes controllers 3, controllers 3 are preassigned mutually different random addresses. Luminaires 1, image sensors 2, controller 3, and external terminal 4 communicate with each other.

External terminal 4 stores map data which is information indicating a provisional arrangement state of luminaires 1, image sensors 2, and controller 3. External terminal 4 is capable of displaying, using the map data, an arrangement state of luminaires 1, image sensors 2, and controller 3 on a screen (display 46 to be described later) in a visually easily understandable manner.

In the lighting system, while (i) luminaires 1, image sensors 2, controller 3, and external terminal 4 are communicating with each other, (ii) a relative positional relationship among luminaires 1 and image sensors 2 is being determined between luminaires 1, image sensors 2, and controller 3 which are actually installed, and external terminal 4, in accordance with an instruction for external terminal 4 from an installation setting person, and (iii) map data is being updated, map data indicating a state in which luminaires 1, image sensors 2, and the like are actually installed is generated.

Luminaire 1 is a luminaire provided to a ceiling portion in an office or a room. Examples of luminaire 1 include a ceiling light, a straight tube light, and a downlight.

Image sensor 2 is a sensor which detects brightness in a room. Image sensor 2 senses brightness in a room into which outside light goes, brightness in a room at a time when luminaire 1 lights up, or the like, based on an illumination distribution in the room. Image sensor 2 is capable of outputting, as an image, the results of sensing to controller 3 and the like.

Controller 3 transmits a dimming signal to image sensor 2. In addition, controller 3 receives an address or position information from image sensor 2.

External terminal 4 transmits to controller 3 an instruction based on an operation received from an installation setting person.

As illustrated by FIG. 2, the lighting system includes image sensors 2, luminaires 1 each connected to a corresponding one of image sensors 2, and controller 3 connected to image sensors 2. Moreover, as stated above, each luminaire 1, each image sensor 2, and controller 3 are preassigned a random address.

Luminaire

Luminaire 1 includes light source 11, power source 12, determiner 13, communication device 14, and storage 15.

Light source 11 emits light which illuminates the inside of a room, in response to an instruction from determiner 13. Light source 11 may include, for instance, a light source using a semiconductor light emitting element such as a light emitting diode. It is to be noted that light source 11 is not limited to the semiconductor light emitting element and may include an incandescent light bulb, a fluorescent light, or the like.

Power source 12 supplies power for light source 11 to light up. In addition, power source 12 supplies power for determiner 13, communication device 14, and storage 15 to operate.

Determiner 13 controls a timing in which light source 11 lights up, and brightness of light source 11. In addition, determiner 13 performs communication processing with image sensor 2 via communication device 14. Determiner 13 is achieved by a dedicated or general-purpose microcomputer, for instance. It is to be noted that determiner 13 may be achieved by a processor which executes a control program stored in storage 15, for instance.

Communication device 14 is a communication interface which transmits address information of luminaire 1 to image sensor 2. In addition, communication device 14 receives, from image sensor 2, a dimming signal indicating brightness of light emitted when luminaire 1 lights up or a control signal indicating an instruction for luminaire 1.

Storage 15 stores an address of a luminaire. Luminaire 1 is preassigned a random address, and this address information is stored in storage 15. Storage 15 is achieved by ROM (Read Only Memory) or RAM (Random Access Memory), for example.

A control signal transmitted from image sensor 2 to luminaire 1 includes an address of luminaire 1 which is a destination. When the address included in the control signal is the same as an address stored in luminaire 1, communication device 14 receives the control signal. Determiner 13 controls light source 11 in accordance with the control signal received by communication device 14, to perform lighting-up, brightness adjustment, extinction of luminaire 1, and the like.

Image Sensor

Image sensor 2 includes image detector 21, power source 22, determiner 23, communication device 24, and storage 25.

Image detector 21 detects light emitted by luminaire 1. Image detector 21 has a function to recognize from which direction light is emitted in a detection area.

Power source 22 supplies power to determiner 23, communication device 24, and storage 25.

Determiner 23 controls communication device 24 and storage 25. Determiner 23 is achieved by a dedicated or general-purpose microcomputer, for instance. It is to be noted that determiner 23 may be achieved by a processor which executes a control program stored in storage 25, for instance.

Communication device 24 communicates with luminaire 1 and controller 3. Communication device 24 transmits an instruction for lighting-up, brightness adjustment, and extinction of subordinate luminaire 1, and receives from subordinate luminaire 1 information indicating a current state. In addition, communication device 24 receives an instruction from controller 3, and transmits a state of image sensor 2 to controller 3.

Storage 25 stores an address of image sensor 2 and an address and a position of subordinate luminaire 1. Storage 25 is achieved by ROM or RAM, for example.

Controller

Controller 3 includes power source 32, determiner 33, communication device 34, and storage 35.

Power source 32 supplies power to determiner 33, communication device 34, and storage 35.

Determiner 33 controls communication device 34 and storage 35. Determiner 33 is achieved by a dedicated or general-purpose microcomputer, for instance. It is to be noted that determiner 33 may be achieved by a processor which executes a control program stored in storage 35, for instance.

Communication device 34 transmits to image sensor 2 a control signal from external terminal 4. In addition, communication device 34 transmits to external terminal 4 a signal from image sensor 2.

Storage 35 stores information from image sensor 2. Storage 35 is achieved by ROM or RAM, for example.

External Terminal

External terminal (operation terminal) 4 includes input device 41, power source 42, determiner 43, communication device 44, storage 45, and display 46. Input device 41 is a user interface which receives an operation from a setting person.

Power source 42 supplies power to input device 41, determiner 43, communication device 44, storage 45, and display 46.

Determiner 43 causes one of luminaires 1 to light up via controller 3. Determiner 43 associates, among icons displayed on display 46, an icon which input device 41 selected by receiving an operation from the installation setting person, with one luminaire 1 caused to light up. Then, determiner 43 associates, based on a relative positional relationship between one luminaire 1 and other luminaires 1 not caused to light up, the other icons not selected by input device 41 with other luminaires 1. The details of the operation of determiner 43 will be described later. Determiner 43 is achieved by a dedicated or general-purpose microcomputer, for instance. It is to be noted that determiner 43 may be achieved by a processor which executes a control program stored in storage 45, for instance.

Communication device 44 communicates with controller 3. Communication device 44 transmits, as a control signal, a content of an operation received from the installation setting person, to controller 3, and receives, from controller 3, positions and addresses of image sensor 2 and luminaire 1.

Storage 45 stores a layout of icons indicating luminaires 1. Specifically, storage 45 stores, as map data, a layout of luminaires 1, image sensors 2, controller 3 along with a floor layout of a room.

The map data is data indicating the layout of luminaires 1, image sensors 2, controller 3 and the floor layout. Storage 45 stores the map data in a manner that the layout is held in coordinates format or image format. Such various formats are used for the map data.

The installation setting person inputs the map data to external terminal 4 using input device 41. The installation setting person inputs the map data to external terminal 4 by arranging icons indicating luminaires 1, image sensors 2, and controller 3 or drawing a schematic diagram of a floor layout, using input device 41 (user interface) included in external terminal 4.

Display 46 displays the map data which the installation setting person inputted to external terminal 4 or instruction information to be transmitted to controller 3, for instance. Display 46 is capable of performing display using GUI (Graphical User Interface).

Display 46 displays a layout. For example, display 46 may display a two-dimensional layout in accordance with actual arrangement positions of luminaires 1, image sensors 2, controller 3, and the like or may three-dimensionally display luminaires 1, image sensors 2, controller 3, and the like, using icons or the like. Moreover, display 46 may display luminaires 1, image sensors 2, controller 3, and the like with colors of the icons changed or may display luminaires 1, image sensors 2, controller 3, and the like along with information such as abbreviated names and category names, in accordance with an instruction from the installation setting person.

[1-2. Operation]

Figure 3:
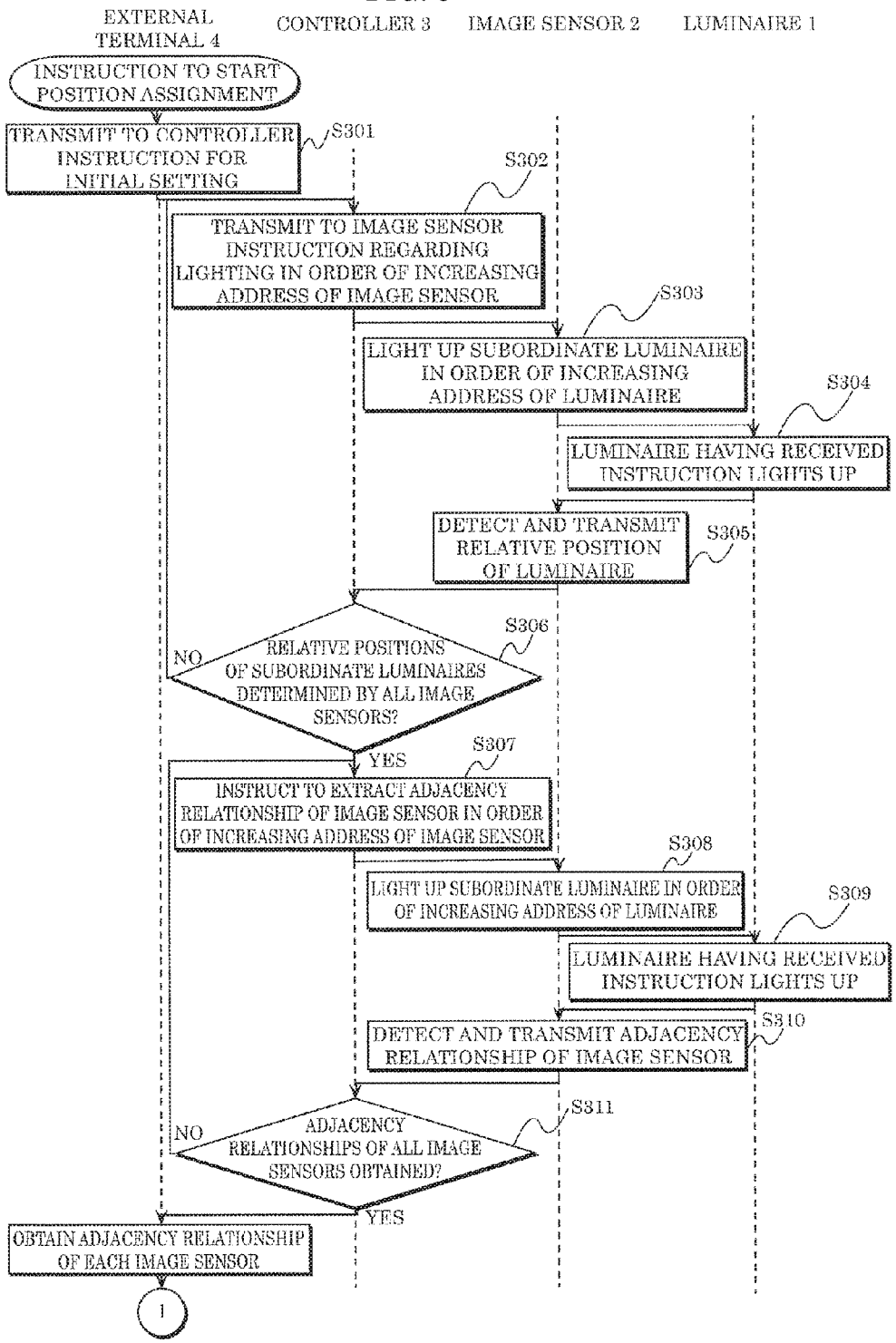
FIG. 3 is a flow chart for determining an address according to the embodiment.
Figure 4:
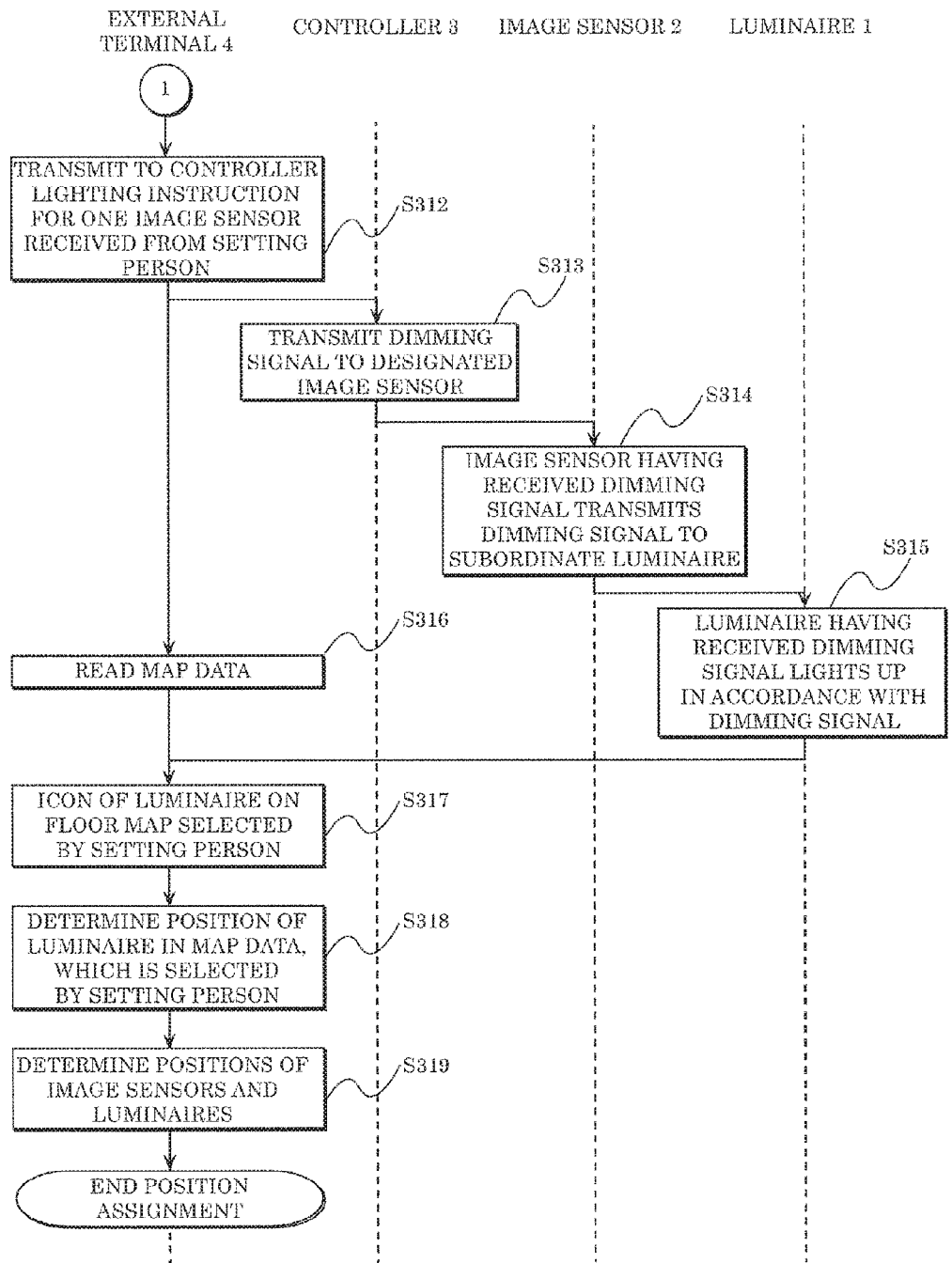
FIG. 4 is a flow chart for determining an address according to the embodiment.

FIGS. 3 and 4 each are a flow chart showing operations of external terminal 4, controller 3, image sensor 2, and luminaire 1 (flow chart for determining an address) according to the embodiment. As explained below, the operation of image sensor 2 is implemented by, for instance, image detector 21, power source 22, determiner 23, communication device 24, and storage 25, the operation of controller 3 is implemented by, for instance, power source 32, determiner 33, communication device 34, and storage 35, and the operation of the external terminal 4 is implemented by, for instance, input device 41, power source 42, determiner 43, communication device 44, storage 45, and display 46.

First, the following describes a method for detecting a relative position of luminaire 1 relative to image sensor 2.

When an installation setting person gives external terminal 4 an instruction for determining a relative position of luminaire 1 relative to image sensor 2 (instruction for initial setting), communication device 44 of external terminal 4 transmits, to communication device 34 of controller 3, a signal indicating the instruction for initial setting (S301). When controller 3 receives the instruction for initial setting from the outside (external terminal 4), controller 3 causes communication device 34 to transmit a signal indicating an instruction regarding lighting of luminaires 1 to communication devices 24 of image sensors 2a to 2d (S302). When image sensors 2a to 2d each receive the instruction regarding lighting, each of image sensors 2a to 2d starts an operation for detecting a relative position of subordinate luminaire 1 of a corresponding one of image sensors 2a to 2d relative to the corresponding one of image sensors 2a to 2d.

Here, image sensors 2a to 2d perform the following operation in order of increasing address. This time, image sensor 2a is provisionally assumed as image sensor 2 having the smallest address. Moreover, image sensor 2a having the smallest address is also hereinafter referred to as master image sensor 2. Furthermore, image sensors 2 except image sensor 2a, that is, image sensors 2b to 2d are also referred to as slave image sensors 2.

When image sensor 2a receives an instruction regarding lighting, image sensor 2a performs, on luminaires 1 (subordinate luminaires 1), lighting control in accordance with the instruction regarding lighting. Specifically, when image sensor 2a receives the instruction regarding lighting, image sensor 2a performs, on luminaires 1, lighting control for causing luminaires 1 to light up one by one as the lighting control in accordance with the instruction regarding lighting. More specifically, image sensor 2a transmits, via communication device 24 to communication devices 14 of four subordinate luminaires 1, a dimming signal indicating a lighting instruction, in order of increasing address (S303). While one of subordinate luminaires 1 is caused to light up (S304), image sensor 2a detects brightness (light intensity) at a time when one luminaire 1 lights up, using image detector 21. With this, image sensor 2a determines which direction relative to image sensor 2a luminaire 1 lighting up is placed, based on the detected light intensity (S305). In other words, image sensor 2a detects a relative position of one luminaire 1 (luminaire 1 lighting up) relative to image sensor 2a. Then, image sensor 2a associates an address of one luminaire 1 caused to light up with the relative position of the same and transmits the address and the relative position to controller 3. Image sensor 2a repeats the above procedure until all addresses and relative positions of subordinate luminaires 1 are determined (S306). Image sensors 2b to 2d, which are slave image sensors 2, follow the same procedure as the procedure of image sensor 2a in order of increasing address, and repeat the procedure until all image sensors 2b to 2d determine addresses and relative positions of subordinate luminaires 1 (S306).

It is to be noted that when slave image sensors 2b to 2d, which are not master image sensor 2, each determine the addresses and the relative positions of subordinate luminaires 1, each of slave image sensors 2b to 2d may transmit to master image sensor 2a information about the addresses and the relative positions of subordinate luminaires 1. In this case, image sensor 2a stores in storage 25 the addresses and the relative positions of subordinate luminaires 1 of image sensor 2a as well as the addresses and the relative positions of subordinate luminaires 1 of image sensors 2b to 2d. Then, master image sensor 2a transmits, via communication device 24 to communication device 34 of controller 3, the addresses of image sensors 2a to 2d and the information about the addresses and the relative positions of subordinate luminaires stored in storage 25, and controller 3 transmits the information to communication device 44 of external terminal 4. At this time, controller 3 stores the information in storage 35.

It is to be noted that every time the addresses and the relative positions of subordinate luminaires 1 of image sensors 2b to 2d are determined, image sensors 2b to 2d may transmit, via master image sensor 2a to controller 3, the information about the addresses and the relative positions of subordinate luminaires 1 or may directly transmit the information to controller 3.

Next, the following describes a method for determining a relative position of image sensor 2 (referred to as image sensor 2a, for instance), among image sensors 2, relative to other image sensors 2 (referred to as image sensors 2b to 2d, for instance). It is to be noted that the above-mentioned instruction for initial setting includes an instruction for determining a relative position of image sensor 2 relative to other image sensors 2, and an operation for determining the relative position of image sensor 2 relative to other image sensors 2 is performed immediately after relative positions of subordinate luminaires 1 relative to image sensors 2 are determined.

The method for determining the relative position of image sensor 2 relative to other image sensors 2 is performed following the same procedure as the procedure of the method for determining the relative position of luminaire 1 relative to image sensor 2. Controller 3 transmits to image sensors 2 an instruction for extracting an adjacency relationship of image sensor 2 (a relative positional relationship relative to other image sensors 2) in order of increasing address (S307). For example, master image sensor 2a instructs subordinate luminaire 1 to light up (S308, S309). Then, image sensors 2b to 2d detect a lighting state of subordinate luminaire 1 of image sensor 2a, and image sensor 2a detects the adjacency relationship of image sensor 2a based on the results of the detection by image sensors 2b to 2d (S310). Subsequently, image sensor 2a transmits the adjacency relationship and address information of image sensor 2a to controller 3 (S310). The following describes the procedure in detail.

First, display 46 of external terminal 4 displays the addresses of image sensors 2a to 2d. An installation setting person specifies an address of any one of image sensors 2 displayed, and designates image sensor 2 having the address as a master image sensor. This time, the installation setting person sets image sensor 2a as master image sensor 2. For example, the installation setting person designates, based on a rule that image sensor 2 having the smallest address is designated as a master image sensor, image sensor 2a having the smallest address displayed by display 46 as a master image sensor.

Communication device 44 of external terminal 4 transmits, via communication device 34 of controller 3 to communication device 24 of image sensor 2a, a signal indicating that an adjacency relationship of image sensor 2 is to be extracted (S307). Image sensor 2a designated as the master image sensor transmits a lighting signal to communication devices 14 of all subordinate luminaires 1 of image sensor 2a to cause all luminaires 1 to light up (S308, S309). At this time, other image sensors 2b to 2d detect brightness as luminaires 1 on which master image sensor 2a performs lighting control light up. Then, master image sensor 2a collects, from other image sensors 2b to 2d, information about the intensity of light detected by other image sensors 2b to 2d and directions in which the light is detected by other image sensors 2b to 2d. Master image sensor 2a recognizes image sensors 2b to 2d which detected, for instance, light having certain intensity or more in predetermined directions, as image sensors 2 adjacent to image sensor 2a in directions corresponding to the predetermined directions. In other words, image sensor 2a detects the relative position of image sensor 2a (adjacency relationship of image sensor 2a) relative to, among image sensors 2, other image sensors 2b to 2d, by other image sensors 2b to 2d detecting the brightness at the time when subordinate luminaires 1 (luminaires 1 around image sensor 2a) on which image sensor 2a performs the lighting control light up. At this time, image sensor 2a transmits information about the detected adjacency relationship to controller 3. Upon completing the detection of the adjacency relationship of image sensor 2a, image sensor 2a transmits an extinction signal to communication devices 14 of subordinate luminaires 1 to cause subordinate luminaires 1 to be extinguished.

The same operation is repeated for image sensors 2b to 2d in order of increasing address. The operation is repeated until image sensors 2b to 2d each determine to which image sensor 2 and in which direction each image sensor is adjacent (S311). Each communication device 24 transmits, to communication device 34 of controller 3, information about the adjacency relationship detected by a corresponding one of image sensors 2b to 2d.

It is to be noted that when image sensors 2b to 2d, which are not master image sensor 2a, detect the adjacency relationships of respective image sensors 2b to 2d, image sensors 2b to 2d may transmit, to communication device 24 of master image sensor 2a, the information about the adjacency relationships. In this case, image sensor 2a stores, in storage 25, the adjacency relationship detected by image sensor 2a and the adjacency relationships detected by respective image sensors 2b to 2d. Then, master image sensor 2a transmits, via communication device 24 to communication device 34 of controller 3, the information about the adjacency relationships of image sensors 2a to 2d stored in storage 25.

Controller 3 determines positions of image sensors 2 and positions of luminaires 1 by collecting the relative positions of image sensors 2 relative to other image sensors 2 and the relative positions of subordinate luminaires 1 relative to respective image sensors 2, on which image sensors 2 perform the lighting control.

As just described, by the installation setting person only giving external terminal 4 the instruction for initial setting, the lighting system automatically determines the relative positional relationship among image sensors 2 and luminaires 1.

Controller 3 having determined the relative positional relationship among image sensors 2 and luminaires 1 transmits, via communication device 34 to communication device 44 of external terminal 4, information about the relative positional relationship among image sensors 2 and luminaires 1. When external terminal 4 receives the information, external terminal 4 stores the information in storage 45.

Next, the following describes a case where external terminal 4 (operation terminal) assigns, in map data, positions in which image sensors 2 and luminaires 1 are actually placed, using positional relationship among image sensors 2 and luminaires 1 determined by controller 3.

External terminal 4 (determiner 43) causes one of luminaires 1 to light up via controller 3.

Specifically, external terminal 4 receives a lighting instruction for one of luminaires 1. More specifically, external terminal 4 receives, from an installation setting person, a lighting instruction for one of subordinate luminaires 1 of one image sensor 2. For example, one image sensor 2 is assumed as master image sensor 2. External terminal 4 transmits, via communication device 44 to controller 3, the lighting instruction for one subordinate luminaire 1 of one image sensor 2, which is received from the installation setting person (S312). Moreover, external terminal 4 reads map data stored in storage 45 and displays the map data on display 46 (S316). Controller 3 transmits, to communication device 24 of image sensor 2 (master image sensor 2a) designated in the lighting instruction, a signal (dimming signal) for causing, among subordinate luminaires 1, one luminaire 1 instructed in the lighting instruction to light up (S313). Image sensor 2a having received the dimming signal transmits, via communication device 24 to communication device 14 of one subordinate luminaire 1, a lighting signal (dimming signal) (S314), one subordinate luminaires 1 of master image sensor 2a lights up in accordance with the dimming signal (S315).

Subsequently, external terminal 4 (determiner 43) associates, among icons displayed on display 46, an icon which input device 41 selected by receiving an operation from the installation setting person, with one luminaire 1 caused to light up. Specifically, the installation setting person visually confirms an actual position of one subordinate luminaire 1 which is lighting up, and selects, as one luminaire 1, an icon in a position in the map data displayed by display 46 of external terminal 4, which corresponds to the actual position. As illustrated by FIG. 5, for example, an icon at a lower left corner on the map data displayed by display 46 is selected (tapped, for instance). As just described, external terminal 4 associates the icon selected by input device 41 with one luminaire 1 caused to light up, by the installation setting person selecting the icon of one subordinate luminaire 1 in the map data (floor map).

With this, external terminal 4 determines the position of luminaire 1 in the map data, which is selected by the installation setting person (S318). Moreover, external terminal 4 determines, as illustrated by FIG. 6, positions of image sensors 2a to 2d from a relative positional relationship between one luminaire 1 and image sensor 2a and adjacency relationships of image sensors 2a to 2d which external terminal 4 has collected so far (S319). With this, the positions of all image sensors 2a to 2d in the map data are determined. Furthermore, since external terminal 4 (determiner 43) has obtained the relative positional relationship between one luminaire 1 and other luminaires 1 not caused to light up, external terminal 4 associates other luminaires 1 not caused to light up with, among the icons, other icons unselected by input device 41, based on the positional relationship. With this, external terminal 4 simultaneously determines the positions of luminaires 1 (subordinate luminaires 1 of respective image sensors 2a to 2d) in the map data as well (S319).

[1-3. Advantageous Effects, Etc.]

The address determining method according to the embodiment is an address determining method for determining, in a lighting system including luminaires 1, image sensors 2 which perform lighting control on luminaires 1, and controller 3 which gives image sensors an instruction regarding lighting of luminaires 1, a positional relationship among luminaires 1 and image sensors 2. When controller 3 receives an external instruction for initial setting, controller 3 gives image sensors 2 the instruction regarding lighting. When image sensor 2 among image sensors 2 receives the instruction regarding lighting from controller 3, image sensor 2 performs lighting control in accordance with the instruction regarding lighting on luminaire 1 among luminaires 1 to determine (i) a relative position of luminaire 1 relative to image sensor 2 and (ii) a relative position of image sensor 2 relative to different image sensor 2 among image sensors 2. Controller 3 determines positions of image sensors and positions of luminaires 1 by collecting the relative positions of image sensors 2 and the relative positions of luminaires 1 determined by image sensors 2.

Moreover, the lighting system according to the embodiment determines the positional relationship among luminaires 1 and image sensors 2 using the above address determining method.

Furthermore, controller 3 according to the embodiment determines the positional relationship among luminaires 1 and image sensors 2 using the above address determining method.

With this, when an installation setting person gives, for example, external terminal 4 the instruction for initial setting, the lighting system determines the relative positions of luminaires 1 relative to image sensor 2 and the relative position of image sensor 2 relative to other image sensors 2. In other words, by the installation setting person only giving external terminal 4 the instruction for initial setting, it is possible to automatically determine the positional relationship among luminaires 1 and image sensors 2. Thus, it is possible to easily determine the positional relationship among luminaires 1 and image sensors 2.

Moreover, when image sensor 2 receives the instruction regarding lighting, image sensor 2 performs, as the lighting control in accordance with the instruction regarding lighting, lighting control for causing luminaires 1 to light up one by one. Then, by detecting brightness of each of luminaires 1 as luminaires 1 light up one by one, image sensor 2 determines the relative positions of luminaires 1 relative to image sensor 2.

With this, it is possible to easily determine the relative positions of respective subordinate luminaires 1 of image sensor 2.

Moreover, by other image sensors 2 detecting brightness as luminaires 1 on which image sensor 2 performs the lighting control light up, image sensor 2 determines the relative position of image sensor 2 relative to other image sensors 2.

With this, by image sensor 2 causing, for example, all subordinate luminaires 1 on which image sensor 2 performs the lighting control to light up, and other image sensors 2 detecting the brightness at the time when all subordinate luminaires 1 of image sensor 2 are lighting up, it is possible to easily determine the relative position of image sensor 2 relative to other image sensors 2.

Moreover, an operation terminal (external terminal 4) according to the embodiment is an operation terminal which gives an instruction for initial setting to controller 3 which performs lighting control on luminaires 1. The operation terminal includes storage 45 which stores a layout of icons indicating luminaires 1, display 46 which displays the layout, input device 41 which receives an operation for display 46 from an installation setting person, and determiner 43. Determiner 43 causes one of luminaires 1 to light up via controller 3. Determiner 43 associates, among icons displayed on display 46, an icon which input device 41 selected by receiving an operation from the installation setting person, with one luminaire 1 caused to light up. Subsequently, determiner 43 associates, among the icons, other icons unselected by input device 41 with, among luminaires 1, luminaires not caused to light up.

With this, when the relative positional relationship among image sensors 2a to 2d and the relative positional relationship of luminaires 1 relative to image sensors 2a to 2d are already determined, the installation setting person only has to confirm an actual position of one of subordinate luminaires 1 of image sensor 2a by causing one luminaire 1 to light up, select an icon corresponding to the actual position of image sensor 2a in map data on external terminal 4, and determine a position of one luminaire 1 in the map data on external terminal 4.

Although it has been time-consuming to determine a positional relationship among luminaires 1 and image sensors 2 (positional relationship in map data) since the installation setting person causes luminaires 1 to light up one by one and arranges icons of corresponding luminaires 1 one by one by operating a screen of external terminal 4, the installation setting person can easily determine the positional relationship among luminaires 1 and image sensors 2 (positional relationship in map data) since the installation setting person only has to perform the operation just once.

Other Embodiments

The lighting system, the controller, the operating terminal, and the address determining method according to the embodiment have been described above, but the present disclosure is not limited to the above embodiment.

For instance, the address determining method according to the present disclosure may be executed by a computer (computer system). Moreover, the present disclosure can be realized as a program for causing a computer to execute steps included in the address determining method. Furthermore, the present disclosure can be realized as a non-transitory computer-readable recording medium on which the program is recorded, such as a CD-ROM.

For example, when the above embodiment of the present invention is realized by a program (software), each step is executed by the program being executed using hardware resources such a CPU, a memory, and an input/output circuit of a computer. In other words, each step is executed by the CPU obtaining data from the memory, the input/output circuit, or the like and computing the data, or outputting the results of computing to the memory, the input/output circuit, or the like.

Moreover, each component included in the lighting system and the operating terminal according to the above embodiment may be realized as a dedicated or general-purpose circuit.

Furthermore, each component included in the lighting system and the operating terminal according to the above embodiment may be realized as an large scale integration (LSI) that is an integrated circuit (IC).

Moreover, the integrated circuit is not limited to the LSI but may be realized by a dedicated circuit or general-purpose processor. FPGA (Field Programmable Gate Array) permitting programming or a reconfigurable processor which can reconfigure connection or setting of circuit cells in the LSI may be used.

Additionally, if a new circuit integration technique is introduced in place of the LSI along with development in semiconductor technology or other derivative technology, it is obvious that the technique may be used for integrating each component included in the lighting system and the operating terminal.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An address determining method for determining, in a lighting system including luminaires, image sensors which perform lighting control for the luminaires, and a controller which gives the image sensors an instruction regarding lighting of the luminaires, a positional relationship among the luminaires and the image sensors; the method comprising:

inputting map data to an external terminal indicating layout of the luminaires, the image sensors, and the controller;

receiving, by the controller, an external instruction for initial setting from the external terminal; and providing, by the controller, the image sensors with the external instruction regarding lighting, wherein when an image sensor among the image sensors receives the external instruction regarding lighting from the controller, the image sensor performs lighting control in accordance with the external instruction regarding lighting on a luminaire among the luminaires to determine (i) a relative position of the luminaire relative to the image sensor, and (ii) a relative position of the image sensor relative to a different image sensor among the image sensors, and determining, by the controller, positions of the image sensors and positions of the luminaires by collecting the relative positions of the image sensors and the relative positions of the luminaires determined by the image sensors.

2. The address determining method according to claim 1, wherein when the image sensor receives the instruction regarding lighting, the image sensor performs, as the lighting control in accordance with the instruction regarding lighting, lighting control for causing the luminaires to light up one by one, and detects brightness of each of the luminaires as the luminaires light up to determine the relative positions of the luminaires relative to the image sensor.

3. The address determining method according to claim 1, wherein the image sensor determines the relative position of the image sensor relative to a different image sensor by the different image sensor detecting brightness of a luminaire among the luminaires as the luminaire lights up.

4. A lighting system including luminaires, image sensors which perform lighting control for the luminaires, and a controller which gives the image sensors an instruction regarding lighting of the luminaires, wherein the controller:

receives an external instruction for initial setting from an external terminal to which map data is inputted, the map data indicating layout of the luminaires, the image sensors, and the controller; and provides the image sensors with the external instruction regarding lighting, when an image sensor among the image sensors receives the external instruction regarding lighting from the controller, the image sensor performs lighting control in accordance with the external instruction regarding lighting on a luminaire among the luminaires to determine (i) a relative position of the luminaire relative to the image sensor, and (ii) a relative position of the image sensor relative to a different image sensor among the image sensors, and the controller determines positions of the image sensors and positions of the luminaires by collecting the relative positions of the image sensors and the relative positions of the luminaires determined by the image sensors.

5. A controller in a lighting system which includes luminaires, image sensors which perform lighting control for the luminaires, and the controller which gives the image sensors an instruction regarding lighting of the luminaires, the controller comprising:

a communication device; and a determiner, wherein the communication device:

receives an external instruction for initial setting from an external terminal to which map data is inputted, the map data indicating layout of the luminaires, the image sensors, and the controller; and provides the image sensors with the external instruction regarding lighting, when an image sensor among the image sensors receives the external instruction regarding lighting from the controller, the image sensor performs lighting control in accordance with the external instruction regarding lighting on a luminaire among the luminaires to determine (i) a relative position of the luminaire relative to the image sensor, and (ii) a relative position of the image sensor relative to a different image sensor among the image sensors, and the determiner determines positions of the image sensors and positions of the luminaires by collecting the relative positions of the image sensors and the relative positions of the luminaires determined by the image sensors.

* * * * *